US008526285B1

(12) United States Patent
Wilson

(10) Patent No.: US 8,526,285 B1
(45) Date of Patent: Sep. 3, 2013

(54) APPARATUS AND METHOD FOR PROVIDING LONGITUDINAL POSITION MARKS ON AN OPTICAL TAPE

(71) Applicant: Oracle International Corporation, Redwood City, CA (US)

(72) Inventor: Scott D. Wilson, Thornton, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 13/673,118

(22) Filed: Nov. 9, 2012

(51) Int. Cl.
*G11B 25/06* (2006.01)
*G11B 7/00* (2006.01)

(52) U.S. Cl.
USPC .......................................... 369/97; 369/44.18

(58) Field of Classification Search
None
See application file for complete search history.

(56) References Cited

U.S. PATENT DOCUMENTS

| 6,493,174 | B1 * | 12/2002 | Stubbs ........................ 360/77.12 |
| 7,646,694 | B2 | 1/2010 | Monen et al. |
| 7,835,108 | B2 * | 11/2010 | Johnson et al. ............. 360/77.12 |
| 2008/0024905 | A1 * | 1/2008 | Johnson et al. ............. 360/77.12 |
| 2011/0199703 | A1 * | 8/2011 | Hansen et al. ............. 360/77.12 |
| 2012/0307399 | A1 * | 12/2012 | Hoerger et al. ................. 360/75 |

* cited by examiner

*Primary Examiner* — Peter Vincent Agustin
(74) *Attorney, Agent, or Firm* — Brooks Kushman P.C.

(57) ABSTRACT

In at least one embodiment, an apparatus for writing data and location marks on an optical tape is provided. The apparatus comprises an optical system that includes at least one laser source for transmitting a laser beam therefrom. The optical system further includes a plurality of lens for receiving the laser beam and for directing the laser beam onto at least one guard band on the optical tape to write the location marks thereon. The location marks being indicative of a longitudinal position of the data that is capable of being stored on a writeable section of the optical tape.

20 Claims, 4 Drawing Sheets

APPARATUS AND METHOD FOR PROVIDING LONGITUDINAL POSITION MARKS ON AN OPTICAL TAPE

TECHNICAL FIELD

Aspects described herein generally to an apparatus and method for providing longitudinal position marks in an optical tape.

BACKGROUND

Longitudinal position ("LP") information in a recording tape assists a tape drive control system to quickly and reliably transport tape to a desired longitudinal position along a length of the tape. This condition may reduce an amount of time a user is required to wait for the tape drive to either retrieve data or to write new data in a pre-designated clear area of the tape. In magnetic tape drives, the LP information is embedded in the tape itself where this LP information is written magnetically during a servo track writing process performed during the manufacturing of the tape cartridge.

One implementation as set forth in U.S. Pat. No. 7,646,694 ("the '694 patent) to Monen et al. provides a method and a system for providing data track identifying information on a recording medium.

For example, the '694 patent provides a method for providing identifying information for a data track in an optical tape. The method comprises transporting the optical tape in a longitudinal direction and scanning at least one laser beam in another direction that is substantially transverse to the longitudinal direction. The method further comprises selecting size and position of a plurality of spaced recording locations in order to obtain a distinguishable pattern of the spaced recording locations and recording a plurality of servomarks at a majority of locations from the plurality of spaced recording locations, each servomark from the plurality of servomarks being substantially located on a data track. The method further comprises omitting recording at preselected locations from the plurality of spaced recording locations and returning the at least one laser beam back to a position substantially on the longitudinal direction. The method further comprises repeating various steps noted above to form all servomarks from the plurality of servomarks in one pass of the optical tape from substantially a beginning of the optical tape to substantially an end of the optical tape; where the preselected locations constitute a pattern providing the identifying information.

SUMMARY

In at least one embodiment, an apparatus for writing data and location marks on an optical tape is provided. The apparatus comprises an optical system that includes at least one laser source for transmitting a laser beam therefrom. The optical system further includes a plurality of lenses for receiving the laser beam and for directing the laser beam onto at least one guard band on the optical tape to write the location marks thereon. The location marks being indicative of a longitudinal position of the data that is capable of being stored on a writeable section of the optical tape.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, RAM, ROM, EPROM, EEPROM, or other suitable variants thereof) and software which co-act with one another to perform any number of the operation(s) as disclosed herein.

The use of longitudinal position (LP) (or location) marks in an optical tape enables a tape drive control system to locate a longitudinal position along the tape. This aspect may reduce the amount of time a customer needs to wait for the tape drive to either retrieve data on the tape or to initiate writing new data in a clear area of the tape. Such location marks may be optically recorded in un-written areas along at least one edge (or guard band) of the optical tape. These aspects and others will be described in more detail below.

Figure 1:
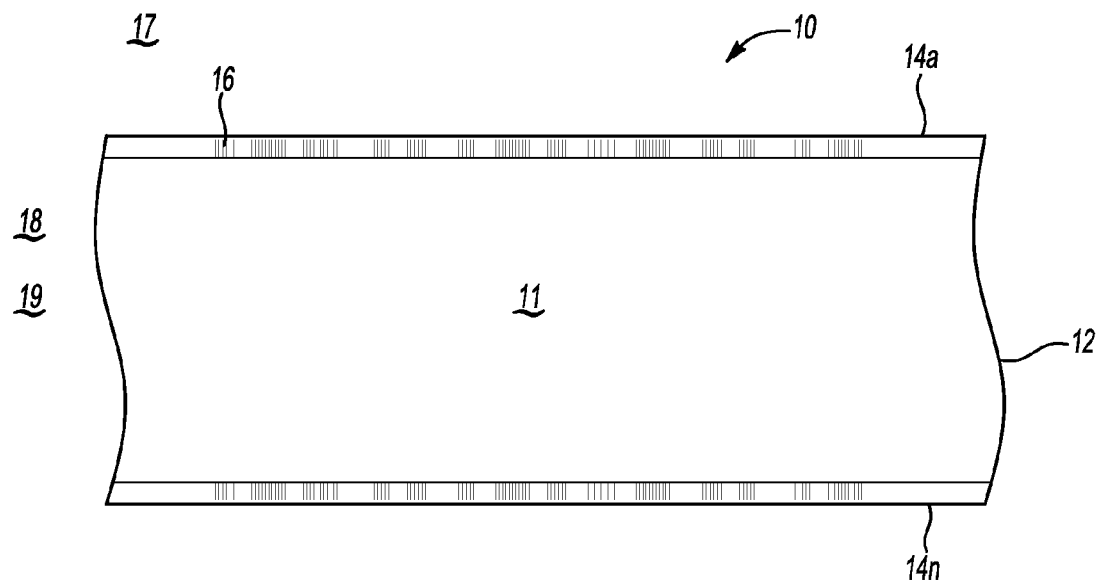
FIG. 1 depicts an optical tape in accordance to one embodiment.

FIG. 1 depicts an optical tape 10 in accordance to one embodiment. The optical tape 10 is generally used in connection with data storage in which data 11 is capable of being written or stored thereon. The optical tape 10 includes a writeable section 12 that is configured to enable a laser source 24 (see FIG. 2) or other suitable device to write the data 11 thereto. A plurality of guard bands 14a-14n ("14") are provided on the tape 10. The guard bands 14 are areas of the tape 10 that are generally not used for purposes of receiving or storing the data 11. Generally, such guard bands 14 may serve as a barrier to prevent the writeable section 12 from being damaged and provides a first point of contact in the event optical tape 10 comes into contact with another object. The guard bands 14 are generally arranged to protect the writeable section 12. Each of the guard bands 14 may have a width of up to 0.5 mm or other suitable dimension.

The optical tape 10 generally includes location marks 16 which are indicative of a longitudinal position along the tape 10 itself. Such location marks 16 may be positioned on the guard bands 14. Previously, the location marks 16 have been written to, or stored on, the writeable section 12 of the tape along with the stored data 11. A single optical tape 10 and its corresponding writeable section 12 may extend over very long distances. The location marks 16 as provided herein generally enable a tape drive control system (or control system) 17 of a tape drive to locate or provide information as to where such a control system 17 is located in relation to the tape 10. The location marks 16 generally serve as guide posts, which indicate to the control system 17 where it is located in connection to the tape 10 itself. The control system 17 generally coordinates the action of all subsystems within a drive. For example, the control system 17 may receive signals from a computer requesting the storage or retrieval of a set of the data 11 on a particular tape cartridge. The control system 17 may also read the data 11 from a directory 18 that indicates the longitudinal position of pre-recorded data to be retrieved or the position of unwritten areas of the tape 10 on which the data 11 can be written thereto. The directory 18 is generally a special area of the tape 10 that may be located at a beginning of the tape 10. The control system 17 may also command tape transport motor(s) 19 to transport the tape 10 to a desired longitudinal position, activate an optical pickup unit(s) (OPUs), verify the longitudinal position, and initiate reading or writing data 11 at the desired longitudinal positioned when reached.

The location marks 16 are used by the control system 17 as a mechanism to determine where to read the data 11 from the tape 10 and where to write the data 11 to unwritten portions of the writeable section 12 of the tape 10. In one example, the location marks 16 may serve as an indicator as to how far down the tape 10 the control system 17 is. As noted above, a record of the location marks 16 as written on the guard bands 14 are stored in the directory 18. As such, in the event a portion of data 11 is to be read at a corresponding location mark 16, the control system 17 may access the directory 18 to locate the location marks 16 and travel to the desired location mark 16 on the tape 10 that corresponds to that set of data and read out the same. Likewise, the control system 17 may recognize location marks 16 that correspond to unwritten portions of the writeable section 12 for purposes of writing data thereto in the event such an operation is desired. In this case, the control system 17 accesses the directory 18 to locate the location mark 16. As shown, the guard band 14a is located on an outer periphery of the writeable section 12. In addition, the guard band 14n is located on an opposite outer periphery of the writeable section 12.

Figure 2A:
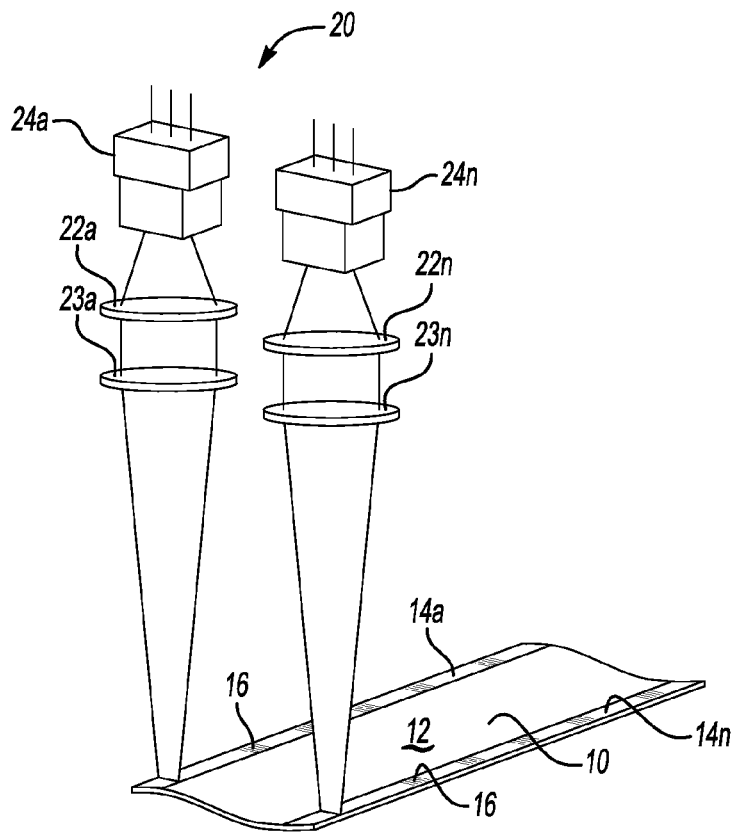
FIGS. 2A-2B depict views of an optical system for writing location marks to the optical tape.

FIG. 2A depicts an optical system 20 for writing the location marks 16 to the optical tape 10 in accordance to one embodiment. The optical system 20 includes a first plurality of lenses 22a-22n ("22'), a second plurality of lenses 23a-23n ("23"), and a plurality of laser sources 24a-24n ("24"). Each laser source 24 may transmit a laser beam over a grouping of the lenses 22 and 23 for writing the location marks 16 to a corresponding guard band 14. For example, the laser source 24a transmits the laser beam over the lenses 22a and the lenses 23a for writing the location marks 16 on the guard band 14a. Likewise, the laser source 24b transmits the laser beam over the lenses 22b and the lenses 23b for writing the location marks 16 on the guard band 14b. The plurality of lenses 22 may be implemented as spherical lenses and the plurality of lenses 23b may be implemented as cylindrical lenses. In general, the spherical lens and the cylindrical lens create a shaped line segment with the laser beam to write the location marks 16 to the guard bands 14.

Figure 2B:
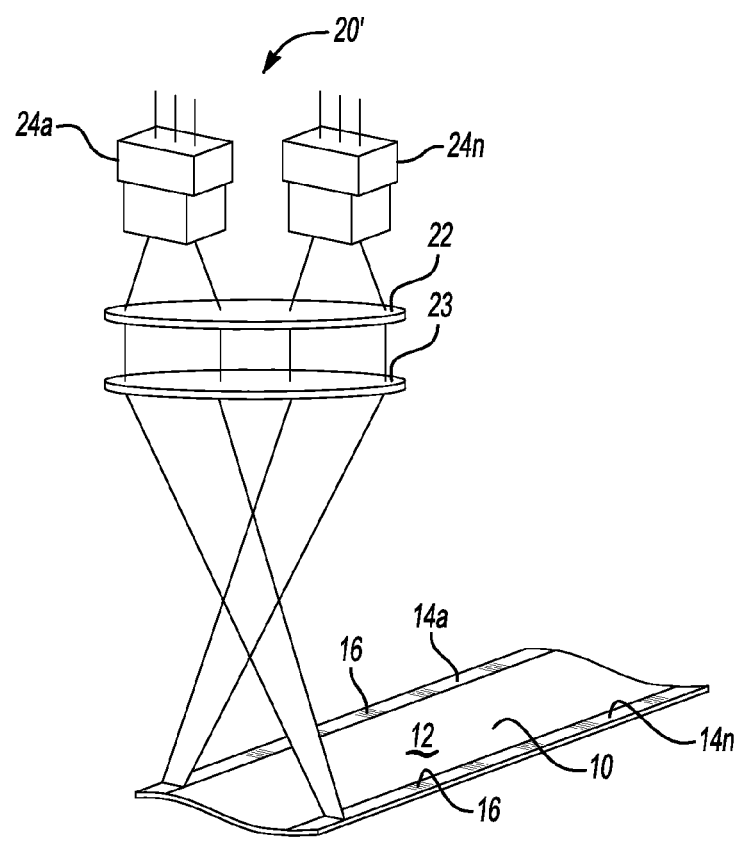

FIG. 2B depicts an optical system 20' for writing the location marks 16 to the optical tape 10 in accordance to one embodiment. The optical system 20' includes a single lens 22 and a single lens 23 and the plurality of laser sources 24. In general, each laser source 24a and 24n transmits a laser beam through the lens 22 and the lens 23 for writing the location marks 16 to the guard bands 14. As shown, the laser source 24a transmits the laser beam through the lens 22 and the lens 23 which directs the laser beam across the tape 10 and onto the guard band 14n. In a similar manner, the laser beam 24n transmits the laser beam through the lens 22 and the lens 23 across the tape 10 and onto the guard band 14a. As noted above, the lens 22 may be implemented as a spherical lens and the lens 23 may be implemented as a cylindrical lens.

Figure 3:
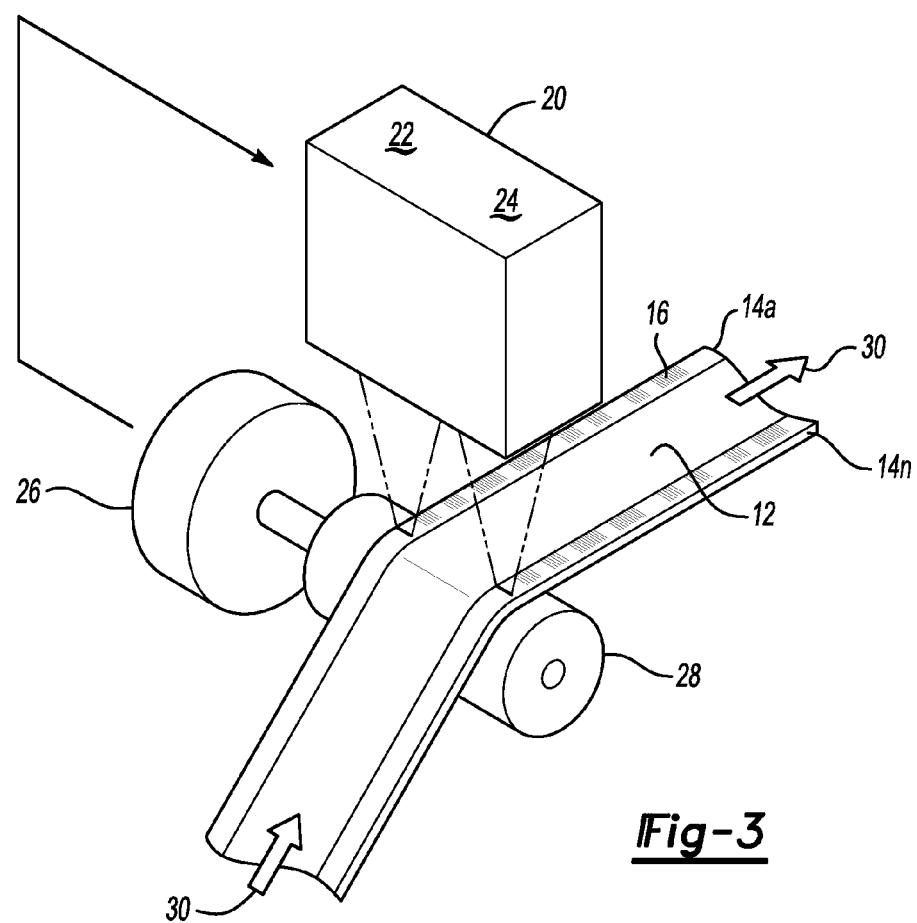
FIG. 3 depicts the optical system for writing location marks to the optical tape in accordance to one embodiment.

FIG. 3 depicts a more detailed view of the optical system 20 or 20' (hereafter "20") for writing the location marks 16 to the optical tape 10 in accordance to one embodiment. It may be desirable to write the location marks 16 to each guard band 14 to account for the situation in which one of the guard bands 14 is damaged at a later point in time. However, it is recognized that the location marks 16 may only be written to one of the guard bands 14. A rotary encoder 26 is operably coupled to the optical system 20. During the location mark 16 writing process, the tape 10 passes over and is in contact with a roller 28 (e.g., capstan roller) that (i) stabilizes a surface of the tape 10 under the optical system 20 and (ii) measures a velocity of the tape with the encoder 26 and electronically synchronizes the location mark 16 writing pulses emitted by the optical system 20 so that the location mark 16 on the tape 10 is generally precise.

The roller 28 rotates to move the tape 10 along a first direction 30 and onto a cartridge assembly (not shown). The roller 28 moves the tape 10 under the optical system 20 to allow the clear sections of the guard bands 14 to receive the location marks 16 from the laser source 24 (i.e., the clear sections of the guard bands 14 have the location marks 16 written thereto). The roller 28 may or may not be connected to a motor that transports the tape 10. The optical system 20 may write the location marks 16 simultaneously on the guard bands 14. In general, the manner in which the optical system 20 writes the location marks 16 onto the guard bands 14 may take place after the tape 10 is assembled into a cartridge (not shown) and then into an LP-writing tape deck (not shown).

In addition, the writing of the location marks 16 onto the guard bands 14 may be executed during the tape 10 manufacturing process after coatings (not shown) are applied to the tape 10. In general, optical coatings are sputtered onto the tape 10 where such coatings are manipulated during the writing process by the laser source 24 to serve as written or stored data on the writeable section 12. This aspect may be extended such that the optical coatings are sputtered onto the guard band(s) 14 so that such coatings are also manipulated during the writing process by the laser source 24 to serve as the location marks 16. By placing the location marks 16 onto the guard bands 14, none of the writing space is precluded from the writeable section 12 of the tape 10.

Figure 4:
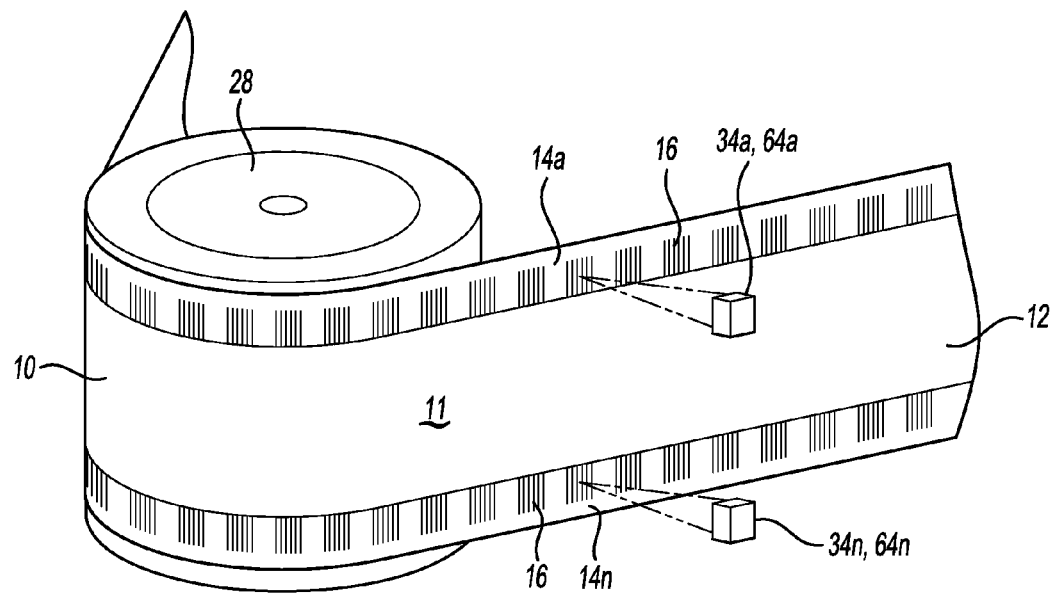
FIG. 4 depicts a plurality of sensors for reading data from the optical tape in accordance to one embodiment.

FIG. 4 depicts a plurality of reflective proximity sensors 34a, 34n for reading the location marks 16 from the guard bands 14 of the optical tape 10 in accordance to one embodiment. The sensors 34 (e.g., see sensor 34a and 34n) may be positioned in an optical drive's tape path for reading the location marks 16 from the guard bands 14.

Figure 5:
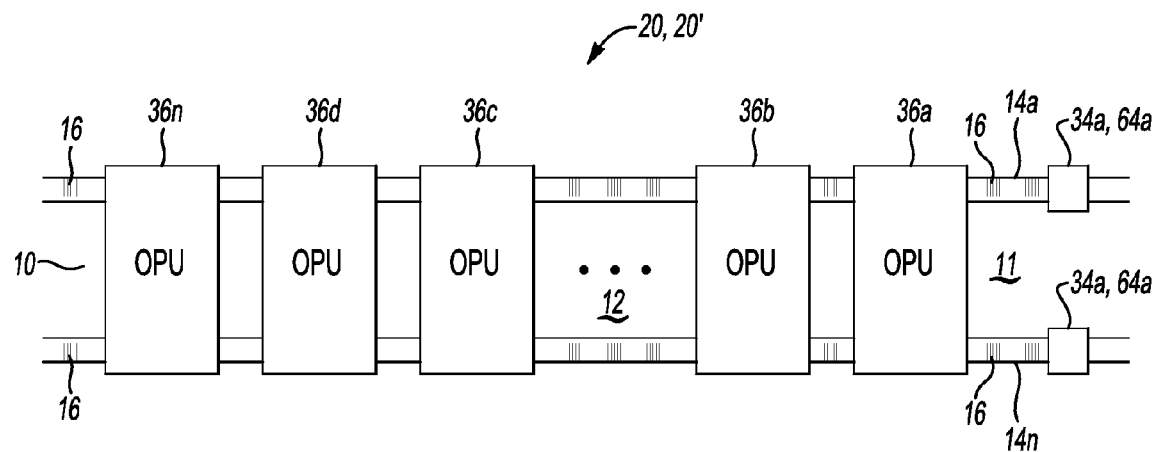
FIG. 5 depicts a plurality of optical pickup units and the plurality of sensors in accordance to one embodiment.

FIG. 5 generally depicts a plurality of OPUs 36a-36n ("36") and the proximity sensors 34. The OPUs 36 are generally arranged to read the data 11 from the writeable section 12 while the proximity sensors 34 read the location mark 16 from the guard bands 14. It is recognized that any number of OPUs 36 may be used for reading data from the writeable section 12. The OPUs 36 may also write data 11 to the tape 10. By providing a set of sensors 34 for reading the location marks 16 and OPUs 36 that read data from the writeable section 12, such a condition may ensure that all OPUs 36 are available for reading or writing data during tape transport.

Figure 6:
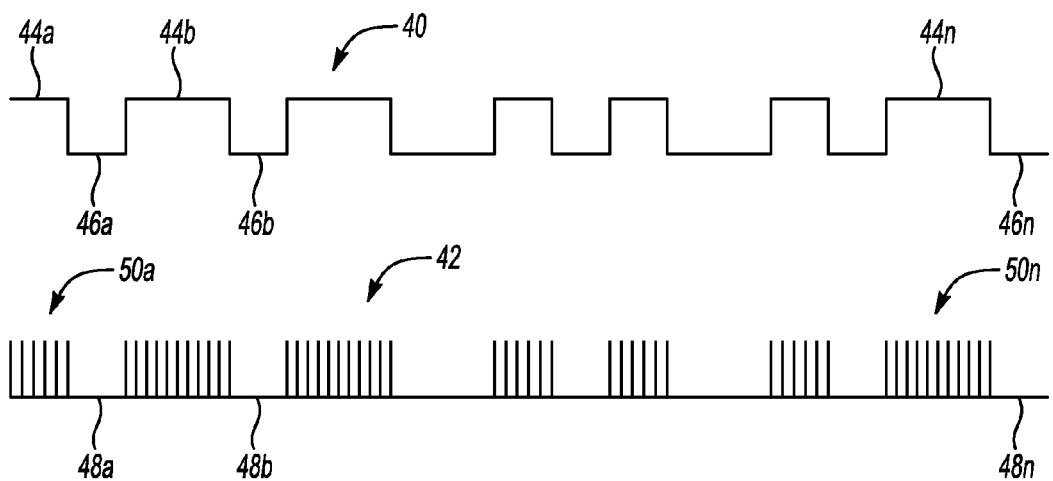
FIG. 6 depicts various waveforms that are indicative of at least two types of location marks in accordance to one embodiment.

FIG. 6 depicts various waveforms 40, 42 that are indicative of at least two types of location marks 16 on the guard bands 14. Waveform 40 generally depicts the location marks 16 as written onto the guard bands 14 via the laser source 24 as two alternating reflectivity levels (e.g., bright and dark). The laser source 24 (see FIG. 3) may write the location marks 16 with the differing reflectivity levels on the guard bands 14. With optical media such as the tape 10, the laser beams may change the reflectivity of the media from low reflectivity to high reflectivity (e.g., "write bright" or alternatively "write dark"). The location marks 16 may be written either way depending on the type of media or tape 10. The difference between the location marks 16 and data 11 are in their dimensions. Generally location marks 16 may be 10s to 100s of microns in size while data marks may be sub-micron in size. In general, the reflective proximity sensors 34 as set forth in FIG. 4 may be used to read the location marks 16 as shown in the waveform 40. For example, various high points 44a-44n ("44") (see FIG. 6) within the waveform 40 are generally indicative of high output (e.g., "1") and various low points 46a-46n ("46") within the waveform 40 are generally indicative of a low output (e.g., "0").

The high points 44 may be written to the guard band 14 with a bright reflectivity level and the low points 46 may be written to the guard bands 14 with a dark reflectivity level. The sensors 34 may be arranged to illuminate a light onto the location marks 16 and capture reflected images from the guard bands 14. The sensors 34 are arranged to detect the reflected light off of the high points 44 and the low points 46 which will vary due to the reflectivity levels (e.g., bright for high point 44 and dark for low points 46) of these points 44, 46. This variation in the reflectivity level in response to the light being directed thereon by the sensor 34 creates a discernible difference between the high points 44 and the low points 46 which enables the sensor 34 to read the location marks 16 on the guard bands 14.

Waveform 42 generally depicts the location marks 16 as written onto the guard bands 14 via the laser source 24 as clear (unmarked) sections 48a-48n ("48") and modulated (or pulsed) areas 50a-50n ("50"). The clear sections 48 are generally indicative of a low output (e.g., "0"). The pulsed sections 50 are generally indicative of a high output (e.g., "1"). In general, high frequency based sensors 64a-64n ("64") (see FIG. 4) may be used to detect the clear sections 48 and the pulsed sections 50. For example, the sensor 64 detects diffracted light at a particular frequency (or wavelength) from the guard bands 14 to read the location marks 16 therefrom in response to illuminating a laser beam (or light from a light emitting diode (LED)) therefrom at a particular wavelength.

Figure 7:
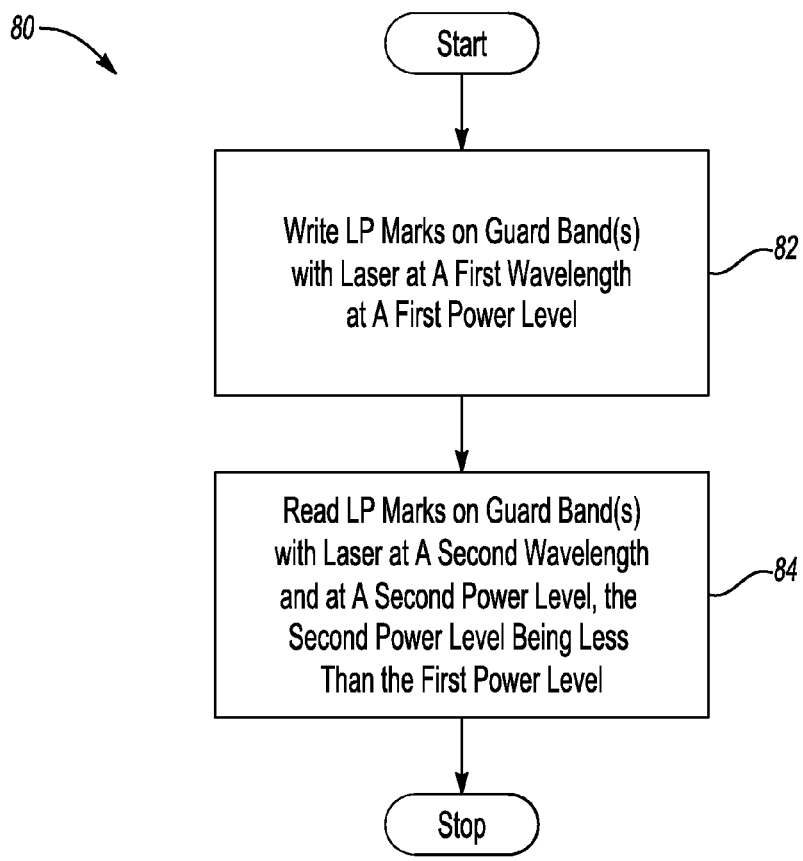
FIG. 7 depicts a method for writing and reading location marks on the optical tape in accordance to one embodiment.

FIG. 7 depicts a method 80 for writing and reading location marks 16 on the optical tape 10 in accordance to one embodiment.

In operation 82, the laser source 24 writes the location marks 16 on the guard bands 14 with a laser beam at a first power level and at a first wavelength (or first frequency).

In operation 84, the sensors 64 read the location marks 16 from the guard band 14 to ascertain the location of the tape at a second power level and at a second wavelength. The second power level being less than the first power level used to write the location marks 16 on the guard bands 14.

In general, it is recognized that the sensor 64 may be arranged to read the location marks 16 at any number of frequencies (or wavelengths) so long as the power level of the laser (or light from the LED) projected by the sensor 64 is less than the power level used by a corresponding laser source 24 to write the location marks 16 at the guard bands 14. In the event the laser (or LED based light beam) projected by the sensor 64 exceed the power level used by the laser source 24 to write the location marks 16, this condition may overwrite the existing location marks 16 recorded on the guard bands 14. In one example, a blue laser may be projected from the sensor 64 at 405 nanometers to read the location marks 16 so long as the power level does not exceed the power level used by the laser source 24 to write the original set of location marks 16.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for writing data and location marks on an optical tape, the apparatus comprising:
    an optical system including:
        at least one laser source for transmitting a laser beam therefrom; and
        a plurality of lenses for receiving the laser beam and for directing the laser beam onto at least one guard band on the optical tape to write the location marks thereon, the location marks being indicative of a longitudinal position of the data that is capable of being stored on a writeable section of the optical tape.

2. The apparatus of claim 1 wherein the at least one guard band extends longitudinally along an outer periphery of the writeable section.

3. The apparatus of claim 2 wherein the at least one guard band is arranged to serve as a barrier for the writeable section for preventing damage to the data thereon.

4. The apparatus of claim 1 wherein the optical tape includes a directory for storing a set of first data indicative of the location marks as written on the at least one guard band.

5. The apparatus of claim 4 further comprising a control system for accessing the directory to locate a desired location mark that is indicative of desired data on the writeable section and to travel along the optical tape to the desired location mark to obtain the desired data to read out the desired data.

6. The apparatus of claim 4 further comprising a control system for accessing the directory to locate a desired location mark that is indicative of an unwritten section on the writeable section and to travel along the optical tape to the desired location mark to the unwritten section.

7. The apparatus of claim 1 wherein the optical system further includes at least one sensor being positioned over the at least one guard band of the optical tape for illuminating a light onto the at least one guard band to capture reflected lights therefrom to read the location marks.

8. The apparatus of claim 7 wherein the optical system is arranged to write the location marks on the at least one guard band at a first wavelength and at a first power level.

9. The apparatus of claim 8 wherein the at least one sensor is arranged to read the location marks at a second wavelength and at a second power level, the second wavelength being different than the first wavelength and the second power level being less than the first power level.

10. The apparatus of claim 1 wherein the plurality of lenses comprise a spherical lens and a cylindrical lens for receiving and directing the laser beam onto the at least one guard band to write the location marks thereon.

11. An apparatus for writing data and location marks on an optical tape, the apparatus comprising:
an optical system configured to:
transmit a first laser beam on a first guard band of the optical tape to write a first set of location marks thereon; and
transmit a second laser beam on a second guard band of the optical tape to write a second set of location marks thereon; each of the first set of location marks and the second set of location marks being indicative of a longitudinal position of the data that is capable of being stored along a writeable section of the tape.

12. The apparatus of claim 11 wherein the first guard band extends longitudinally along a first outer periphery of the writeable section.

13. The apparatus of claim 12 wherein the second guard band extends longitudinally along a second outer periphery of the writeable section, the first outer periphery being different than the second outer periphery.

14. The apparatus of claim 11 wherein each of the first guard band and the second guard band are arranged to serve as a barrier for the writeable section for preventing damage to the data thereon.

15. The apparatus of claim 11 wherein the tape includes a directory for storing first data indicative of the first set of location marks and the second set of location marks as written on the first guard band and the second guard band, respectively.

16. The apparatus of claim 15 further comprising a control system for accessing the first data on the directory to locate the first set of location marks and the second set of location marks for locating desired data on the writeable section to read out the desired data.

17. The apparatus of claim 15 further comprising a control system for accessing the directory to locate the first location marks and the second location marks for locating an unwritten section on the writeable section.

18. The apparatus of claim 11 wherein the optical system is further configured to write the first set of location marks and the second set of location marks on the first guard band and the second guard band, respectively, at a first wavelength and at a first power level.

19. The apparatus of claim 18 wherein the optical system is further configured to read the first set of location marks and the second set of location marks at a second wavelength and at a second power level, the second wavelength being different than the first wavelength and the second power level being less than the first power level.

20. An apparatus for reading data and location marks on an optical tape, the apparatus comprising:
a plurality of optical pickup units (OPUs) for reading data stored on a writeable section of the optical tape; and
a plurality of sensors for reading location marks from at least one guard band on the optical tape, wherein the location marks are indicative of a longitudinal position of the data on the writeable section and the at least one guard band being located on an outer periphery of the writeable section.

* * * * *